United States Patent
Kim

(10) Patent No.: US 12,481,088 B2
(45) Date of Patent: Nov. 25, 2025

(54) PROTECTIVE FILM MODULE AND METHOD FOR MANUFACTURING DISPLAY DEVICE USING THE SAME

(71) Applicant: Samsung Display Co., LTD., Yongin-si (KR)

(72) Inventor: Kitaek Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 246 days.

(21) Appl. No.: 18/211,678

(22) Filed: Jun. 20, 2023

(65) Prior Publication Data

US 2024/0103202 A1    Mar. 28, 2024

(30) Foreign Application Priority Data

Sep. 16, 2022   (KR) .................. 10-2022-0116875

(51) Int. Cl.
  *G02B 1/00*     (2006.01)
  *G02B 1/14*     (2015.01)
  *G06F 1/16*     (2006.01)

(52) U.S. Cl.
  CPC ............ *G02B 1/14* (2015.01); *G06F 1/1652* (2013.01)

(58) Field of Classification Search
  CPC ... G02B 1/14; G06F 1/1652; B32B 17/10027; B32B 7/023; B32B 7/12; B32B 37/02; B32B 2307/412; B32B 2457/20
  See application file for complete search history.

(56) References Cited

U.S. PATENT DOCUMENTS 10,665,816 B2    5/2020   Oh et al.
2023/0017835 A1*  1/2023  Lee .................. G02B 1/14

FOREIGN PATENT DOCUMENTS

KR    101375948 B1    3/2014
KR    20200033366 A   3/2020
KR    102388900 B1    4/2022

\* cited by examiner

*Primary Examiner* — Euncha P Cherry
(74) *Attorney, Agent, or Firm* — CANTOR COLBURN LLP

(57) ABSTRACT

A protective film module, having a first region corresponding to a thin-film glass and a second region surrounding the first region, includes: a first film configured to protect a first surface of the thin-film glass; a first adhesive layer disposed between the thin-film glass and the first film, and in contact with the first surface of the thin-film glass in the first region; a second film configured to protect a second surface of the thin-film glass, where the second surface is the opposite to the first surface; a third film disposed between the thin-film glass and the second film in the first region; and a second adhesive layer disposed between the second film and the third film, and in contact with the third film in the first region, where the first adhesive layer and the second adhesive layer are adhered to each other in the second region.

20 Claims, 13 Drawing Sheets

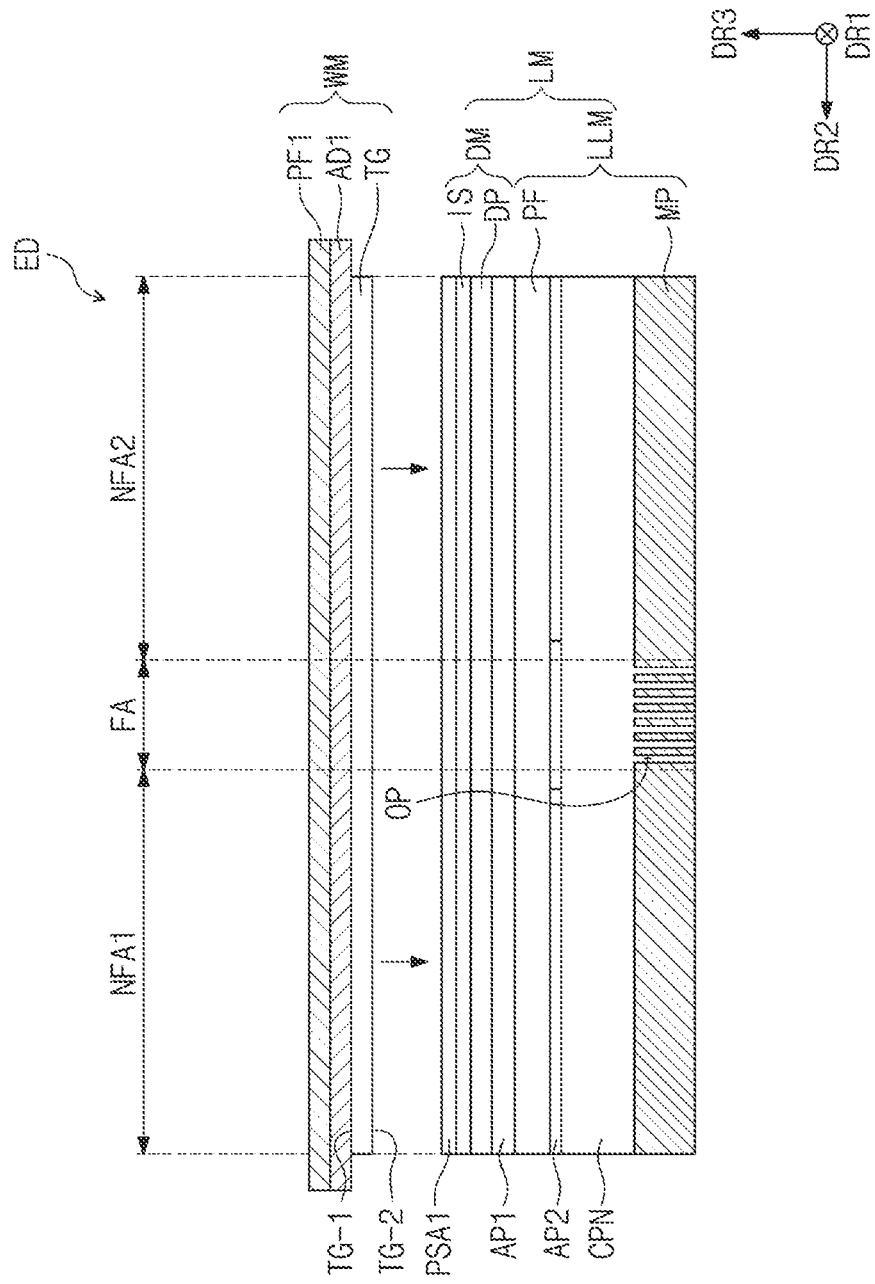

PROTECTIVE FILM MODULE AND METHOD FOR MANUFACTURING DISPLAY DEVICE USING THE SAME

This application claims priority to Korean Patent Application No. 10-2022-0116875, filed on Sep. 16, 2022, and all the benefits accruing therefrom under 35 U.S.C. § 119, the content of which in its entirety is herein incorporated by reference.

BACKGROUND

The present disclosure herein relates to a protective film module and a method for manufacturing a display device using the same, and more particularly, to a protective film module including a plurality of films which protect thin-film glass, and a method for manufacturing a display device using the protective film module.

Various display devices used in multimedia apparatuses such as televisions, mobile phones, tablet computers, navigation systems, and game consoles are being developed. In particular, recent developments of foldable or rollable display devices having flexible display members are in progress to promote user convenience as well as portability.

For a foldable or rollable display device, ultra-thin glass ("UTG"), which is ultra-thin tempered glass, may be used in order to achieve a foldable or rollable display device. UTG is so thin, less than about 100 micrometers (μm) and is thus flexibly foldable, and also has scratch-resistant glass material characteristics.

SUMMARY

The present disclosure provides a protective film module capable of preventing an adhesive from being transferred to a surface of thin-film glass, and also preventing foreign substances from entering the side surface of the thin-film glass during distributing or handling of the thin-film glass.

The present disclosure also provides a method for manufacturing a display device using the protective film module which protects the thin-film glass.

An embodiment of the invention provides a protective film module including a first region corresponding to a thin-film glass, and a second region surrounding the first region.

An embodiment of the invention provides a protective film module including a first film, a first adhesive layer, a second film, a third film, and a second adhesive layer. The first film protects a first surface of the thin-film glass. The first adhesive layer is disposed between the thin-film glass and the first film, and in contact with the first surface of the thin-film glass in the first region. The second film protects a second surface of the thin-film glass, wherein the second surface is opposite to the first surface. The third film is disposed between the thin-film glass and the second film in the first region. The second adhesive layer is disposed between the second film and the third film, and in contact with the third film in the first region. The first adhesive layer and the second adhesive layer are adhered to each other in the second region.

In an embodiment, the third film may be in contact with the second surface of the thin-film glass in the first region.

In an embodiment, the side surface of the third film may protrude outward more than the side surface of the thin glass in a plan view.

In an embodiment, the planar area of each of the first film and the second film may be greater than the planar area of the third film.

In an embodiment, corresponding side surfaces of the first film, the first adhesive layer, the second film, and the second adhesive layer may be aligned with each other.

In an embodiment, the third film may have a thickness of about 40 μm to about 60 μm.

In an embodiment, the second region may include an inside region, and an outside region which surrounds the inside region and in which the first adhesive layer and the second adhesive layer are adhered to each other.

In an embodiment, a space may be defined between the first adhesive layer and the second adhesive layer in the inside region.

In an embodiment, the first film may include a material different from the second film, and include an optically transparent material.

In an embodiment, the first adhesive layer and the second adhesive layer may be detachably adhered to each other.

In an embodiment, the outside region, in which the first adhesive layer and the second adhesive layer are adhered to each other, may have a constant width.

In an embodiment, the first adhesive layer and the second adhesive layer may be tightly adhered to each other in the outside region, to seal the thin-film glass.

In an embodiment of the invention, a method for manufacturing a display device using a protective film module includes: preparing a lower module, preparing a thin-film glass which is protected by a protective film module, removing at least one component of the protective film module coupled to the thin-film glass, and coupling the thin-film glass onto the lower module. The protective film module includes: a first film configured to protect a first surface of the thin-film glass; a first adhesive layer disposed between the thin-film glass and the first film; a second film configured to protect a second surface of the thin-film glass, where the second surface is opposite to the first surface; a third film disposed between the thin-film glass and the second film; and a second adhesive layer disposed between the second film and the third film. The protective film module includes a first region corresponding to the thin-film glass in a plan view and a second region surrounding the first region, the first adhesive layer may be in contact with the first surface of the thin-film glass in the first region, the third film overlaps the first region in the plan view, the second adhesive layer is in contact with the third film in the first region, and the first adhesive layer and the second adhesive layer are adhered to each other in the second region.

In an embodiment, in the removing of the at least one component of the protective film module, the first film, the first adhesive layer, the second film, the second adhesive layer, and the third film may be removed.

In an embodiment, the lower module may include a display module including a display panel configured to display an image, and a support module, and the support module may include a support plate disposed under the display module and a protective layer disposed between the support plate and the display module.

In an embodiment, the method may further include preparing an upper module, and coupling the upper module to the thin-film glass.

In an embodiment, the upper module may include a thin-film glass protective layer disposed on the thin-film glass, and an upper adhesive layer disposed between the thin-film glass and the thin-film glass protective layer.

In an embodiment, in the removing of at least a portion of the protective film module, the second film, the second adhesive layer, and the third film may be removed.

In an embodiment, the first film may include an optically transparent material.

In an embodiment, in the preparing of the thin-film glass protected by the protective film module, the first film and the first adhesive layer may be coupled onto the first surface of the thin-film glass, and then the second film, the second adhesive layer, and the third film may be coupled onto the second surface of the thin-film glass.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings:

FIG. 13 illustrates coupling a thin-film glass and remaining components of a protective film module onto a lower module in a method for manufacturing a display device using a protective film module according to an embodiment of the invention;

DETAILED DESCRIPTION

Figure 1:
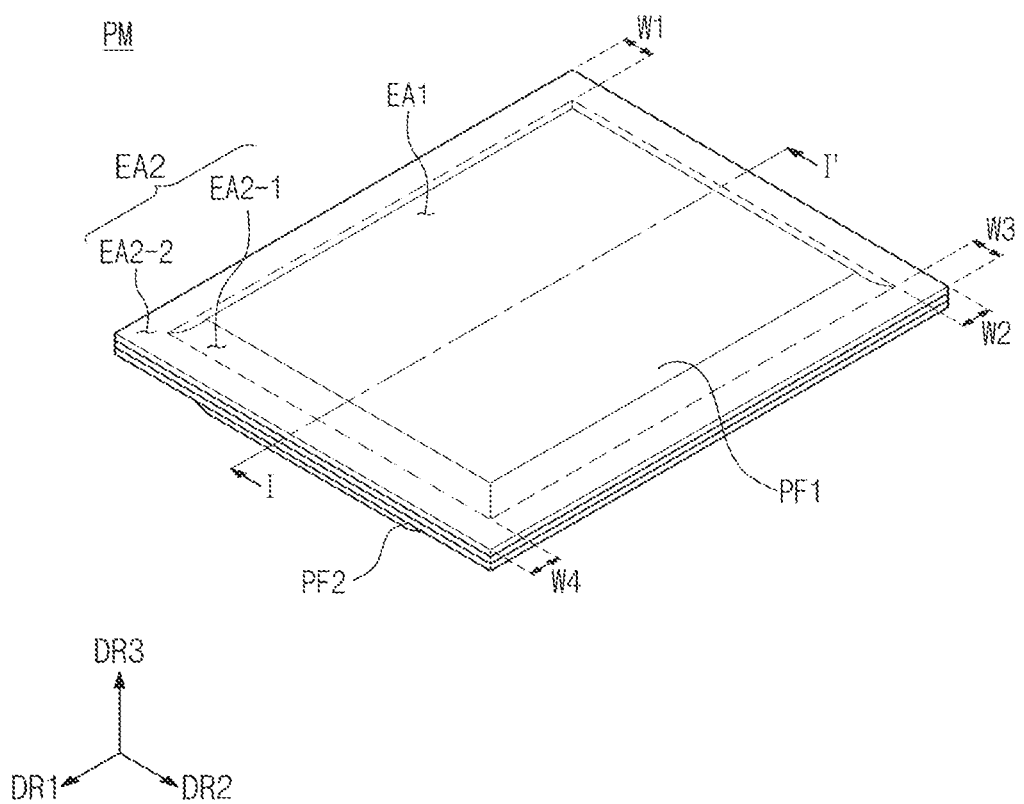
FIG. 1 is a perspective view of a protective film module according to an embodiment of the invention.

In this specification, it will be understood that when an element (or a region, a layer, a portion, or the like) is referred to as being "on", "connected to" or "coupled to" another element, it may be directly disposed on, connected or coupled to the other element, or intervening elements may be disposed therebetween.

Like reference numerals or symbols refer to like elements throughout. In the drawings, the thickness, the ratio, and the size of the element are exaggerated for effective description of the technical contents. As used herein, the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the invention. Similarly, a second element, component, region, layer or section may be termed a first element, component, region, layer or section. As used herein, the singular forms, "a", "an" and "the" are intended to include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be further understood that the terms "includes" and/or "have", when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a protective film module PM according to an embodiment of the invention will be explained in detail with reference to the accompanying drawings.

FIG. 1 is a perspective view of a protective film module PM according to an embodiment of the invention.

Referring to FIG. 1, the protective film module PM may include a first region EA1 and a second region EA2. The first region EA1 may be a region corresponding to a thin-film glass TG in a plan view illustrated in FIG. 2. That is, the first region EA1 may refer to a region inside an outer border of the thin-film glass TG when the outer border of the thin-film glass TG extends in a third direction DR3 and in the opposite direction of the third direction DR3.

The second region EA2 may be a region surrounding the first region EA1. The second region EA2 may include an inside region EA2-1 and an outside region EA2-2.

The inside region EA2-1 may surround the first region EA1, and may be disposed between the first region EA1 and the outside region EA2-2.

Figure 2:
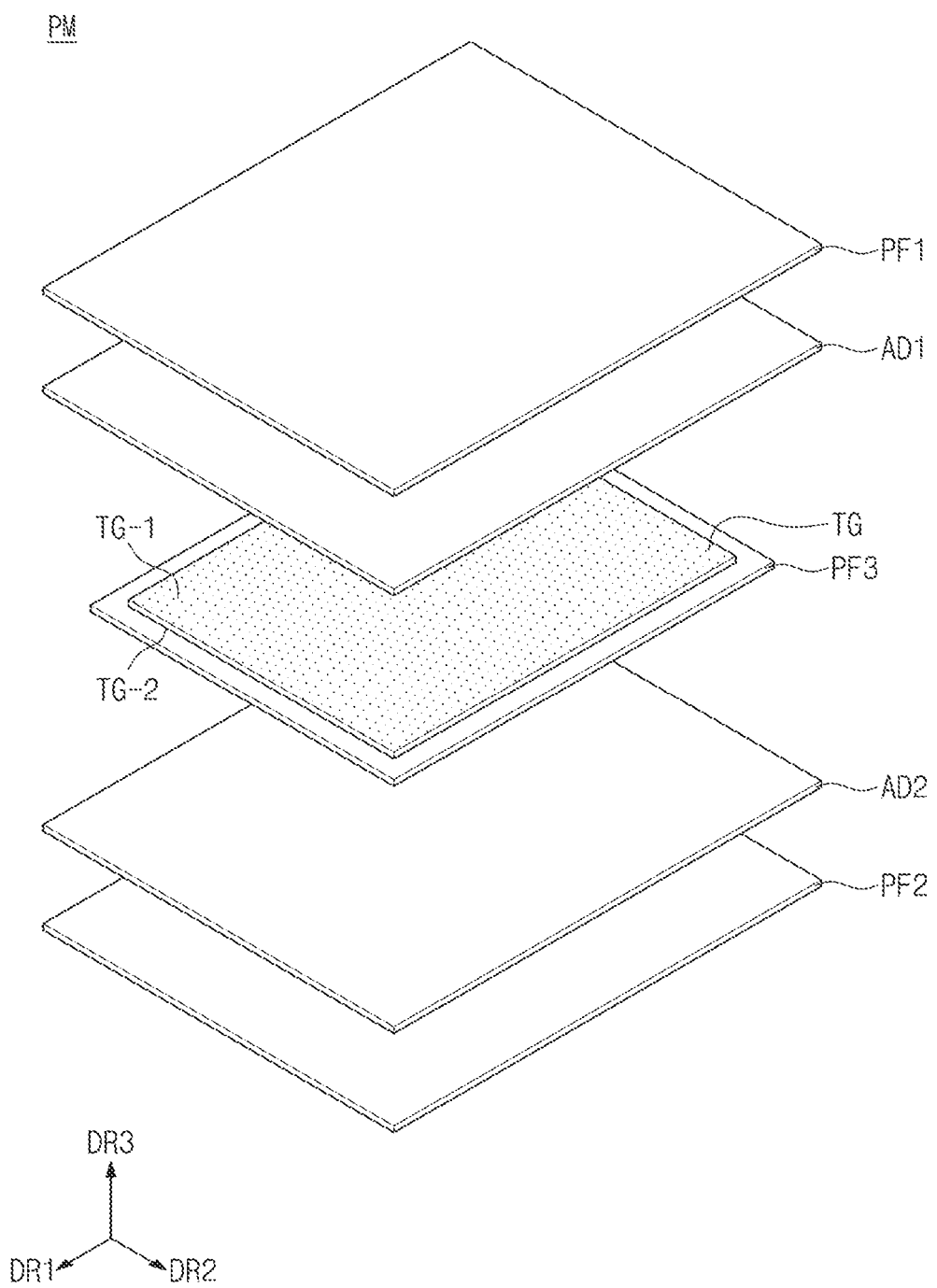
FIG. 2 is an exploded perspective view of a protective film module according to an embodiment of the invention.

The outside region EA2-2 may be disposed surrounding the inside region EA2-1. The outside region EA2-2 may be a region in which a first adhesive layer AD1 and a second adhesive layer AD2, which will be described later with reference to FIG. 2, are adhered to each other. This will be described later with reference to FIG. 3.

All widths W1, W2, W3, and W4 of the outside region EA2-2 may be constant. That is, for example, each of a first width W1 and a third width W3 of the outside region EA2-2 measured in a second direction DR2 may be same along a first direction DR1, and each of a second width W2 and a fourth width W4 of the outside region EA2-2 measured in the first direction DR1 may be same along the second direction DR2.

Here, the first region EA1, the inside region EA2-1, and the outside region EA2-2 may be continuously connected.

Figure 3:
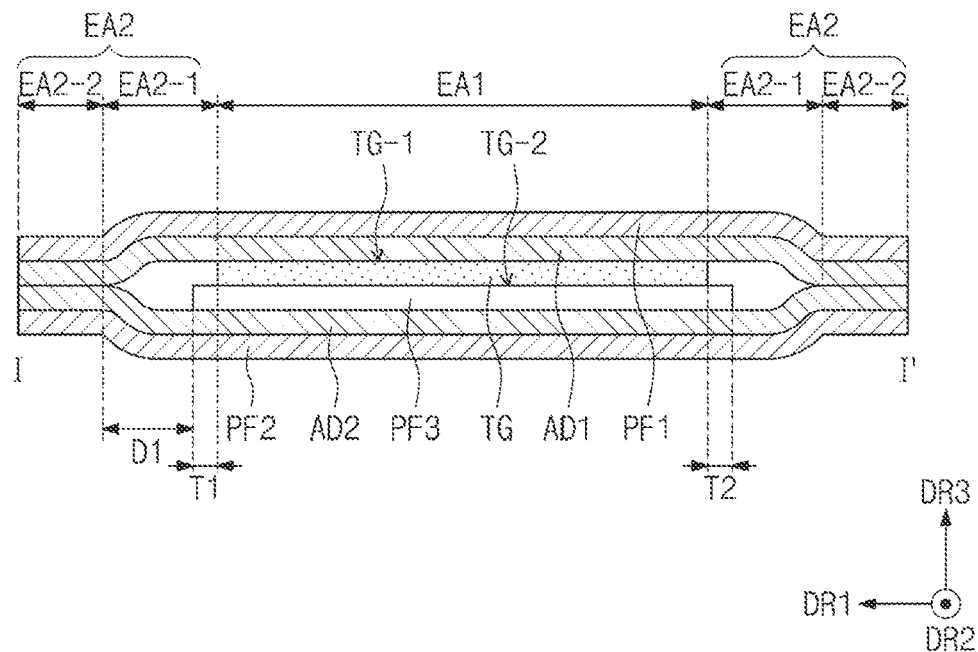
FIGS. 3 and 4 are cross-sectional views taken along line I-I' of FIG. 1 according to an embodiment of the invention.

FIG. 2 is an exploded perspective view of the protective film module PM according to an embodiment of the invention, and FIG. 3 is a cross-sectional view taken along line I-I' of FIG. 1.

Referring to FIGS. 2 and 3, the protective film module PM may include a first film PF1, a first adhesive layer AD1, a second film PF2, a second adhesive layer AD2, and a third film PF3. Here, a person skill in the art related to the present embodiment may understand that commonly available components other than the components illustrated in FIG. 2 and FIG. 3 may be further included in the protective film module PM.

The first film PF1 may protect a first surface TG-1 of the thin-film glass TG. The first film PF1 may protect the thin-film glass TG before assembly, and may be detached from the thin-film glass TG when the thin-film glass TG is assembled with the display device. That is, the thin-film glass TG may be assembled with the display device in a state in which the first film PF1 is detached from the thin-film glass TG.

The first film PF1 may have the area enough to cover the first surface TG-1 of the thin-film glass TG. That is, the first film PF1 may extend in the planar direction defined by the first direction DR1 and the second direction DR2 such that the side surfaces of the thin-film glass TG are sealed together with the second film PF2.

In addition, since the first film PF1 may have the area enough to seal the thin-film glass TG and the third film PF3, the planar area of the first film PF1 may be greater than the planar area of the third film PF3. Here, the "planar area" of a film means a total area of the film in a plan view, and the "plan view" is a view in the third direction DR3.

The first film PF1 may have a flat surface parallel to the first surface TG-1, which is the front surface of the thin-film glass TG, in the first region EA1 corresponding to the thin-film glass TG. A portion of the first film PF1 in the first region EA1 may correspond to the plane defined by the first direction DR1 and the second direction DR2. The first film PF1 may be located in the outermost region of the protective film module PM in the normal direction of the first surface TG-1, thereby preventing the thin-film glass TG from being damaged by external impact, or preventing the quality of the thin-film glass from being degraded due to foreign substances entering the thin-film glass TG.

The first film PF1 may be disposed on the first adhesive layer AD1, and may have the area substantially same as the area of the first adhesive layer AD1. The first film PF1 may be adhered onto the first surface TG-1 of the thin-film glass TG by the first adhesive layer AD1.

The first film PF1 may curvedly extend along the first direction DR1 in the inside region EA2-1 of the second region EA2 when covering the thin-film glass TG. The first film PF1 may have flexibility to be curved.

The first film PF1 may be made of polyethylene terephthalate ("PET") which has impact resistance and thermal resistance enough to protect the thin-film glass TG. However, a material of the first film PF1 is not limited thereto, and various materials may be utilized.

The first adhesive layer AD1 may be disposed between the thin-film glass TG and the first film PF1, and may provide adhesive strength so as to fix the first film PF1 onto the first surface TG-1 of the thin-film glass TG. The first adhesive layer AD1 may be in contact with the first surface TG-1, which is the front surface of the thin-film glass TG, in the first region EA1.

The first adhesive layer AD1 may be spaced apart from the thin-film glass TG, the third film PF3, and the second adhesive layer AD2 in the inside region EA2-1 of the second region EA2. This may prevent the transfer of an adhesive which is caused by unnecessary contacts of the first adhesive layer AD1 with a side surface of the thin-film glass TG.

Meanwhile, when a distance D1 from the outer surface of the third film PF3 to the end of the inside region EA2-1 is increased as the inside region EA2-1 expands, there is a possibility that the third film PF3 may be displaced. Therefore, the inside region EA2-1 may have such a size that the third film PF3 is not displaced while the first adhesive layer AD1 is not in contact with a side surface of the thin-film glass TG.

The first adhesive layer AD1 may be adhered to the second adhesive layer AD2 in the outside region EA2-2 of the second region EA2. As described in FIG. 1, all the widths W1, W2, W3, and W4 of the outside region EA2-2 may be same. Hence, the first adhesive layer AD1 and the second adhesive layer AD2 may have uniform adhesive strengths along the first direction DR1 and the second direction DR2 to prevent any one adhesive surface from being detached.

At this time, the first adhesive layer AD1 is adhered to the second adhesive layer AD2 tightly enough to seal the thin-film glass TG. Therefore, it may be possible to prevent foreign substances from entering a side surface of the thin-film glass TG.

The first adhesive layer AD1 may be adhered to the first surface TG-1 of the thin-film glass TG and the second adhesive layer AD2 in a mutually detachable manner. Therefore, when the thin-film glass TG is needed for the manufacturing of the display device, the first film PF1 may be detached from the thin-film glass TG.

The second film PF2 may protect a second surface TG-2 opposite to the first surface TG-1 of the thin-film glass TG. The second film PF2, like the first film PF1, may be detached from the thin-film glass TG.

The second film PF2 may have the area enough to cover the second surface TG-2 of the thin-film glass TG. In addition, the planar area of the second film PF2 may be greater than the planar area of the third film PF3 since the second film PF2 needs to have the area enough to seal the thin-film glass TG and the third film PF3.

The second film PF2 may have, in the first region EA1, a flat surface parallel to the second surface TG-2, which is the rear surface of the thin-film glass TG. A portion of the second film PF2 in the first region EA1 may correspond to the plane defined by the first direction DR1 and the second direction DR2. The second film PF2 may be located in the outermost region of the protective film module PM in the normal direction of the second surface TG-2, and thereby preventing the thin-film glass TG from being damaged by external impact, or preventing the quality of the thin-film glass from being degraded due to foreign substances entering the thin-film glass TG.

The second film PF2 may be disposed on the second adhesive layer AD2, and may have the area substantially same as the area of the second adhesive layer AD2. The second film PF2 may be adhered onto the second surface TG-2 of the thin-film glass TG by the second adhesive layer AD2.

The second film PF2 may curvedly extend along the first direction DR1 in the inside region EA2-1 of the second region EA2. The second film PF2 may have flexibility to be curved.

The second film PF2 may use a film the type of which is the same as a type of the first film PF1.

The first film PF1 and the second film PF2 may be adhered to each other by the first adhesive layer AD1 and the second adhesive layer AD2 in the outside region EA2-2. As illustrated in FIG. 3, the second film PF2, the second adhesive layer AD2, the first adhesive layer AD1, and the first film PF1 may be stacked in sequence in the outside region EA2-2. In the outside region EA2-2, corresponding sides of the first film PF1, the first adhesive layer AD1, the second adhesive layer AD2, and the second film PF2 may be aligned without steps therebetween, thereby preventing foreign substances entering through gaps caused by the steps.

The second adhesive layer AD2 may be disposed between the second film PF2 and the third film PF3, and may provide adhesive strength so as to fix the second film PF2 onto the second surface TG-2 of the thin-film glass TG. The second adhesive layer AD2 may be in contact with the second surface TG-2, which is the rear surface of the thin-film glass TG, in the first region EA1.

The second adhesive layer AD2 may be spaced apart from the thin-film glass TG, the third film PF3, and the first adhesive layer AD1 in the inside region EA2-1 of the second region EA2. Therefore, it may be possible to prevent the transfer of an adhesive which is caused by unnecessary contact of the second adhesive layer AD2 with a side surface of the thin-film glass TG.

The second adhesive layer AD may be adhered to the second surface TG-2 of the thin-film glass TG and to the first adhesive layer AD1 in a mutually detachable manner.

The third film PF3 may be in direct contact with the second surface TG-2, which is the rear surface of the thin-film glass TG, to protect the second surface TG-2. The third film PF3 may also be removed at a time when the first film PF1 and the second film PF2 are detached.

The third film PF3 may be disposed between the thin-film glass TG and the second film PF2 in the first region EA1. The third film PF3, unlike the first film PF1 and the second film PF2, may be in contact with the second surface TG-2 of the thin-film glass TG without an additional adhesive layer. The pressure in the third direction DR3 caused by the adhesion of the first adhesive layer AD1 and the second adhesive layer AD2 is generated, and therefore the third film PF3 may not deviate substantially from the region corresponding to the second surface TG-2.

The third film PF3 may have a thickness of about 40 micrometers (μm) to about 60 μm. When the thickness of the third film PF3 is less than about 40 μm, the distance between the second surface TG-2 of the thin-film glass TG and the second adhesive layer AD2 may be reduced, and may thus increase the likelihood of the transfer of an adhesive to the second surface TG-2. When the thickness of the third film PF3 is greater than about 60 μm, the total thickness of the thin-film glass TG and the third film PF3 to be sealed may increase, and thus the area of the outside region EA2-2, which is the adhesion area to secure sealing, may also increase. Therefore, the third film PF3 may have a thickness of about 40 μm to about 60 μm. As used herein, the thickness of a film, glass or layer is measured in the third direction DR3.

The third film PF3 may have an enough area to cover the second surface TG-2 of the thin-film glass TG. The side surfaces of the third film PF3 may be spaced apart by predetermined distance T1 and T2 from the side surfaces of the thin-film glass TG toward the outside, respectively. That is, the side surface of the third film PF3 protrudes outward more than the side surface of the thin glass TG in a plan view.

The third film PF3 may block the second surface TG-2 of the thin-film glass TG from coming into direct contact with the second adhesive layer AD2, and may thus prevent the second surface TG-2, the required adhesive strength of which is high, from being contaminated by the transfer of an adhesive. The size of the third film PF3 may be sufficient as long as the third film PF3 covers the second surface TG-2 which is to be protected, so that the second surface TG-2 does not come into direct contact with the second adhesive layer AD2.

However, since the third film PF3 is not adhered to the thin-film glass TG by an adhesive, the third film PF3 may be displaced during distribution and handling of the protective film module PM. Moreover, the center of the third film PF3 and the center of the thin-film glass TG may become misaligned.

Accordingly, the third film PF3 may become lopsided, thus causing the transfer of an adhesive from the second adhesive layer AD2 to a portion which is not covered by the third film PF3 in the second surface TG-2 of the thin-film glass TG. Therefore, the side surfaces of the third film PF3 may be spaced apart by predetermined distance T1 and T2 from the side surfaces of the thin-film glass TG toward the outside, respectively.

Figure 4:
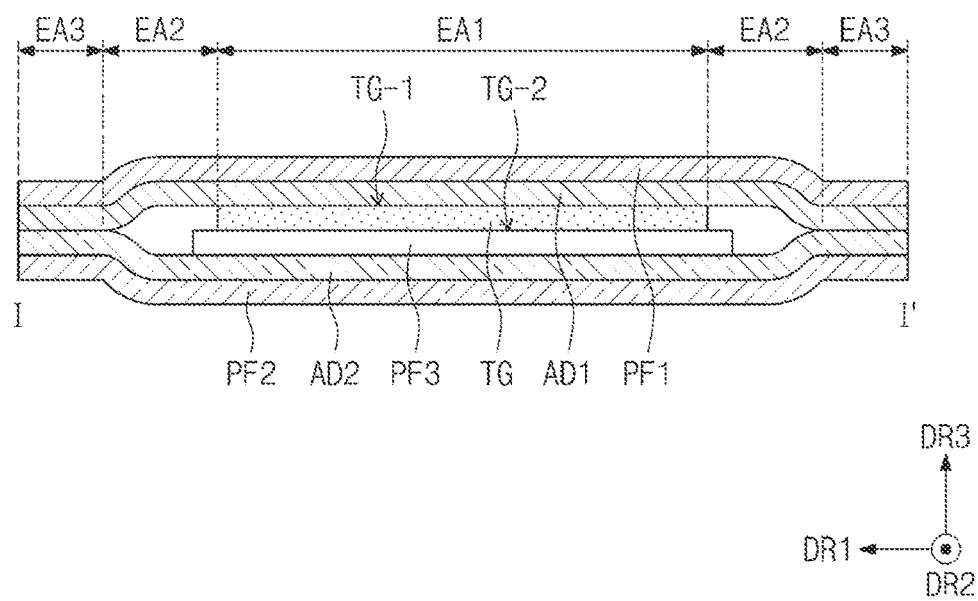

FIG. 4 is a cross-sectional view taken along line I-I' of FIG. 1 according to an embodiment of the invention.

Referring to FIG. 4, the protective film module PM according to an embodiment of the invention has the same configuration as the protective film module PM previously described regarding FIG. 3, except for a first film PF1, and thus duplicate descriptions of the same components will be omitted.

According to this embodiment, the first film PF1 may include a material different from a material of the second film PF2. The first film PF1 may protect the thin-film glass TG before assembly, and when the thin-film glass TG is assembled with the display device, the first film PF1, unlike the second film PF2, may serve as a protective layer of the thin-film glass TG in a state of not being detached from the thin-film glass TG.

The first film PF1 may include an optically transparent material so that the light passing through the thin-film glass TG in the third direction DR3 may be emitted to the outside.

Hereinafter, a display device ED according to an embodiment of the invention will be described.

Figure 5:
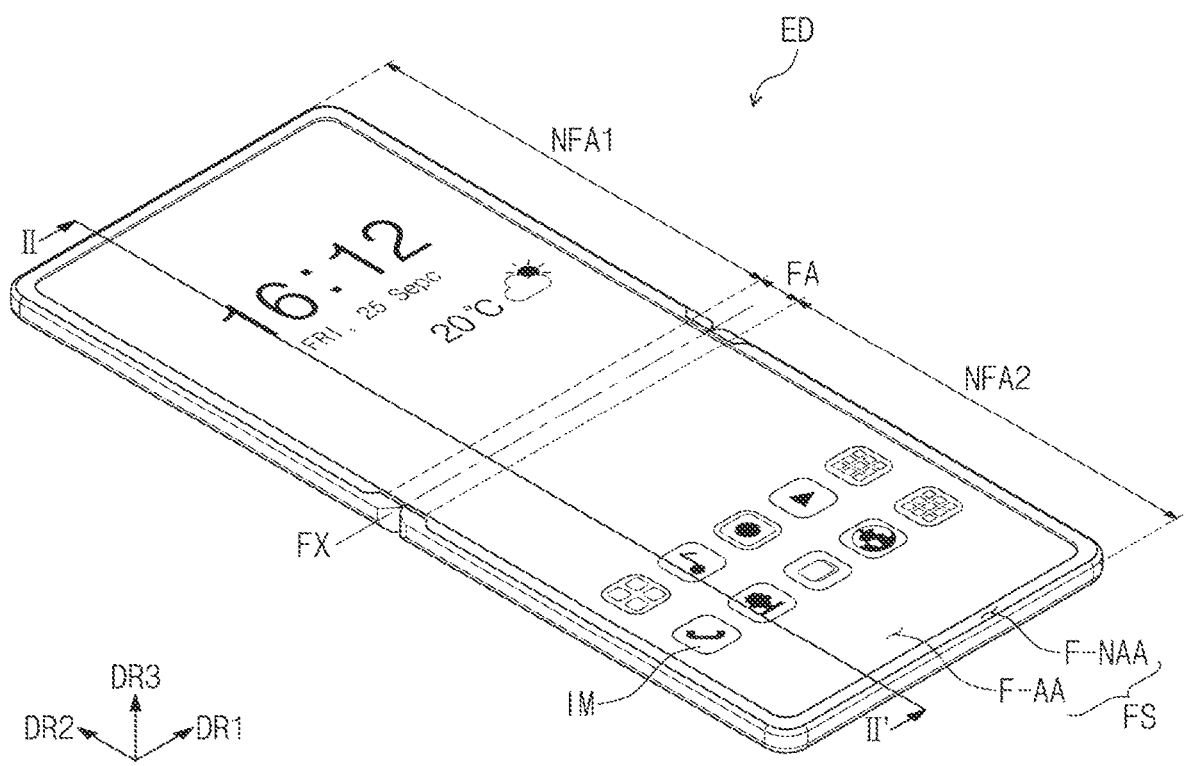
FIG. 5 is a perspective view of a display device using a protective film module according to an embodiment of the invention.
Figure 6:
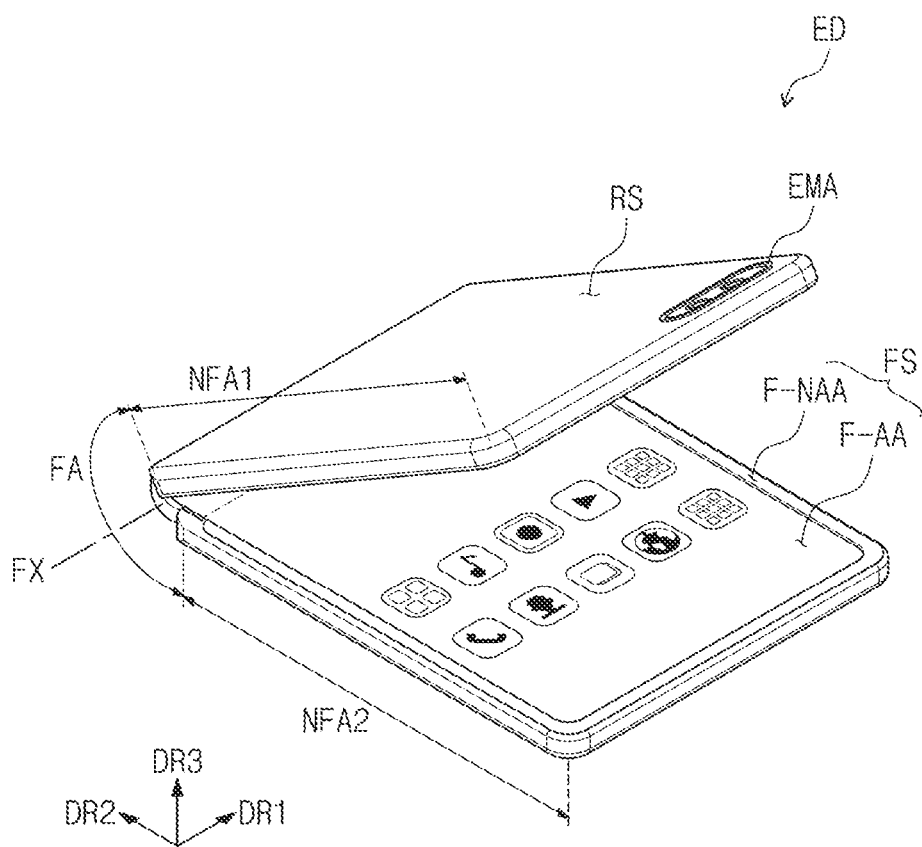
FIG. 6 is a perspective view illustrating an in-folding process of a display device according to an embodiment of the invention.

FIG. 5 is a perspective view of a display device ED using a protective film module PM according to an embodiment of the invention, and FIG. 6 is a perspective view illustrating an in-folding process of the display device ED of the embodiment illustrated in FIG. 5.

In an embodiment, the display device ED may be a device activated in response to an electrical signal. For example, the display device ED may be a mobile phone, a tablet computer, a navigation system, a game console, or a wearable device. However, an embodiment of the invention is not limited thereto. In FIGS. 5 and 6 of this specification, a mobile phone is exemplarily illustrated as the display device ED.

Referring to FIGS. 5 and 6, the display device ED according to an embodiment of the invention may include a first display surface FS defined by a first direction DR1 and a second direction DR2. The first display surface FS may include an active region F-AA and a peripheral region F-NAA. The display device ED may provide an image IM to a user through the first display surface FS. In an embodiment, the display device ED may display the image IM toward a third direction DR3 through the first display surface FS parallel to each of the first direction DR1 and the second direction DR2. In this specification, the front surface (or top surface) and the rear surface (or bottom surface) of each component are defined with respect to a direction in which the image IM is displayed. The front surface and the rear surface are opposite to each other in the third direction DR3, and the normal direction of each of the front surface and the rear surface may be parallel to the third direction DR3.

The display device ED according to an embodiment may be folded around a folding axis FX extending in one direction parallel to the first direction DR1. FIG. 6 illustrates that the extension direction of the folding axis FX is parallel to the extension direction of one side of the display device ED. However, an embodiment of the invention is not limited thereto.

The display device ED according to an embodiment may include at least one folding region FA and non-folding regions NFA1 and NFA2 adjacent to the folding region FA. The non-folding regions NFA1 and NFA2 may be disposed apart from each other with the folding region FA therebetween.

The folding region FA has a predetermined curvature and a predetermined radius of curvature. In an embodiment, the first non-folding region NFA1 and the second non-folding region NFA2 may face each other, and the display device ED may be in-folded such that the first display surface FS is not exposed to the outside.

Alternatively, unlike what is illustrated in the drawing, the display device ED may be out-folded such that the first display surface FS is exposed to the outside. Meanwhile, in an embodiment, the first display surface FS may be viewed to a user when the display device ED is not folded, and a second display surface RS may be viewed to the user when the display device ED is in-folded. The second display surface RS may include an electronic module region EMA in which an electronic module having various components is disposed.

The display device ED according to an embodiment may include the second display surface RS, and the second display surface RS may be defined as a surface opposite to at least a portion of the first display surface FS. The second display surface RS may be viewed to a user when the display device is in-folded. The second display surface RS may include an electronic module region EMA in which an electronic module having various components is disposed. Meanwhile, in an embodiment, an image may also be provided through the second display surface RS.

In an embodiment, the display device ED may be configured to repeat unfolding and in-folding operations, or unfolding and out-folding operations. However, an embodiment of the invention is not limited thereto, and in an embodiment, the display device ED may be configured to select any one among unfolding, in-folding, and out-folding operations.

Figure 7:
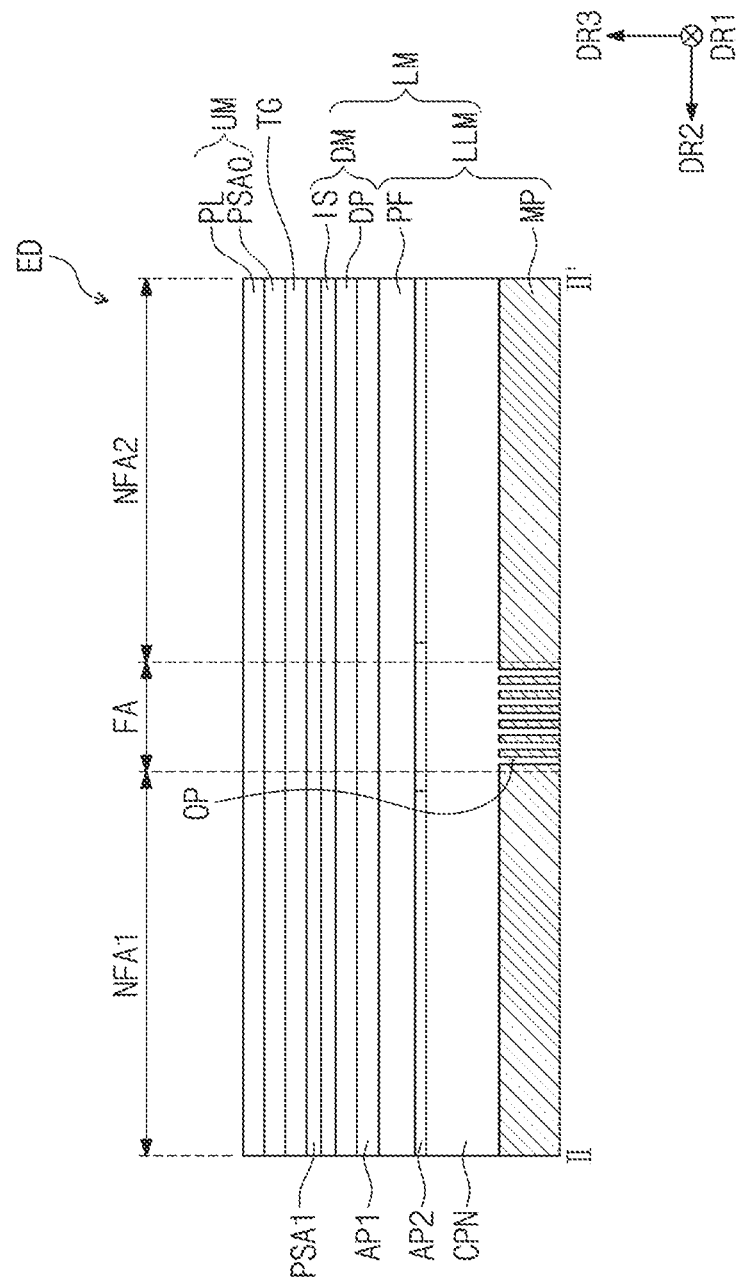
FIG. 7 is a cross-sectional view taken along line II-II' of FIG. 5.

FIG. 7 is a cross-sectional view taken along line II-II' of FIG. 5.

Referring to FIG. 7, the display device ED according to an embodiment may include a lower module LM, a thin-film glass TG disposed above the lower module LM, and an upper module UM disposed above the thin-film glass TG. The thin-film glass TG and the upper module UM may cover the outer side of the display module DM. The upper module UM may include a thin-film glass protective layer PL and an upper adhesive layer PSA0. The lower module LM may include a display module DM and a support module LLM.

The thin-film glass TG according to an embodiment is disposed on the display module DM. The thin-film glass TG and the upper module UM may include optically transparent insulating materials. The thin-film glass TG and the upper module UM may protect a display panel DP, an input sensor IS, and the like. The image IM generated by the display panel DP may be provided to a user by passing through the thin-film glass TG and the upper module UM. The thin-film glass TG and the upper module UM may provide a touch surface of the display device ED. In the display device ED including the folding region FA, the thin-film glass TG may be made of flexible glass capable of folding.

The thin-film glass TG may be made of ultra-thin glass (UTG) which is thin enough to be foldable. However, the material of the thin-film glass TG is not limited thereto, and any material, which is optically transparent and thus allows images provided by the display module DM of the display device ED to be provided to a user, may be used with no limitation.

The thin-film glass TG may have a thickness of about 50 μm to about 100 μm. When the thickness of the thin-film glass TG is less than about 50 μm, the thin-film glass TG fails to serve as a support layer of the upper module UM, or to protect the display module DM or the like thereunder. In addition, when the thickness of the thin-film glass TG is greater than about 100 μm, the thickness of the entire display device ED may increase. In particular, when the display device ED is foldable as illustrated in FIGS. 5 and 6, the quality of folding may be degraded as the thickness of the thin-film glass TG increases.

The thin-film glass protective layer PL may be disposed above the thin-film glass TG. The thin-film glass protective layer PL may be a functional layer that increases the durability of the thin-film glass TG and also serves as an anti-fingerprint layer or an anti-contamination layer. The top surface of the thin-film glass protective layer PL may be the uppermost surface exposed to the outside.

The thin-film glass protective layer PL may have flexible characteristics to be used for a foldable display device ED. The thin-film glass protective layer PL may have a total light transmittance of about 90% or more, a yellow index of about 2% or less, and a haze value of about 0.5% or less. When satisfying the conditions within the above-mentioned ranges, the light transmittance of the thin-film glass protective layer PL may be improved.

The thin-film glass protective layer PL may have a thickness of about 5 μm to about 20 μm. When the thickness of the thin-film glass protective layer PL is less than about 5 μm, the function of protecting the thin-film glass TG may be degraded, and thus the durability of the thin-film glass TG may be reduced. Moreover, when the thickness of the thin-film glass protective layer PL is less than about 5 μm, the thin-film glass protective layer PL may not have a surface hardness enough to protect the display module DM. In addition, when the thickness of the thin-film glass protective layer PL is greater than about 20 µm, the thin-film glass protective layer PL may not be suitable for achieving a thin display device or foldable display device.

The upper adhesive layer PSA0 is disposed between the thin-film glass TG and the thin-film glass protective layer PL, and may thus increase the adhesive force between the thin-film glass TG and the thin-film glass protective layer PL. The upper adhesive layer PSA0 may have a thickness of about 10 µm to about 50 µm. The upper adhesive layer PSA0 may have an acrylate-based adhesive. However, the material for the upper adhesive layer PSA0 is not limited thereto, and various kinds of adhesive materials may be used, such as a material including an optically transparent adhesive resin.

In the display device ED according to an embodiment, the display module DM may display images in response to an electrical signal, and may transmit and receive information on external inputs. The display module DM may be defined as a display region which outputs images, and as a non-display region (not shown).

The display module DM may include a display panel DP and an input sensor IS disposed on the display panel DP. In addition, although not illustrated in the drawing, the display module DM may further include an optical layer (not shown) disposed on the input sensor IS. The optical layer (not shown) may have a function of decreasing the reflection of external light. For example, the optical layer (not shown) may include a polarization layer or a color filter layer.

The display panel DP may include a display element layer. For example, the display element layer may include an organic electroluminescent element, a quantum dot light-emitting element, a liquid crystal element layer, or the like. However, an embodiment of the invention is not limited thereto.

In the display device ED according to an embodiment, the input sensor IS may include a plurality of sensing electrodes for sensing external inputs. The input sensor IS may be a capacitance-type sensor, but is not particularly limited to any type. The input sensor IS may be directly disposed on the display panel DP through a continuous process during the manufacturing of the display panel DP. However, an embodiment of the invention is not limited thereto, and the input sensor IS may be manufactured as a separate panel from the display panel DP, and attached to the display panel DP by an adhesive layer (not shown) in another embodiment.

The display device ED may include an intermediate adhesive layer PSA1 disposed between the thin-film glass TG and the display module DM. The intermediate adhesive layer PSA1 may be an optically clear adhesive ("OCA") film or an optically clear adhesive resin ("OCR") layer. Meanwhile, in an embodiment, the intermediate adhesive layer PSA1 may be omitted.

In the display device ED according to an embodiment, the support module LLM may include at least one of a support plate MP, a protective film PF, or a buffer layer CPN. For example, the display device ED according to an embodiment may include a support plate MP disposed under the display module DM, a protective film PF disposed between the support plate MP and the display module DM, and the buffer layer CPN disposed above the support plate MP.

The support plate MP may be disposed under the display module DM, and may have a plurality of openings OP defined therein. The plurality of openings OP may be defined in a region corresponding to the folding region FA, but may not be defined in the non-folding regions NFA1 and NFA2.

The protective film PF may be disposed between the display module DM and the support plate MP. The protective film PF may be a layer disposed under the display module DM and protecting the rear surface of the display module DM.

The buffer layer CPN may serve as a thickness compensation layer that compensates the thickness of the lower side of the display module DM, or as a support layer that supports the display module DM.

The display device ED according to an embodiment may further include at least one of adhesive layers AP1 and AP2. For example, a first lower adhesive layer AP1 may be disposed between the display module DM and the protective film PF, and a second lower adhesive layer AP2 may be disposed between the protective film PF and the buffer layer CPN. The at least one of the adhesive layers AP1 and AP2 may be an optically clear adhesive (OCA) film or an optically clear adhesive resin (OCR) layer. However, an embodiment of the invention is not limited thereto, and the at least one of the adhesive layers AP1 and AP2 may be an adhesive layer having a low transmittance of about 80% or less.

Hereinafter, a method for manufacturing a display device ED will be described.

Here, since the following display device ED is the same as the display device ED previously described, descriptions of the same components are omitted, and the same reference numerals or symbols are used for the same components.

Figure 8:
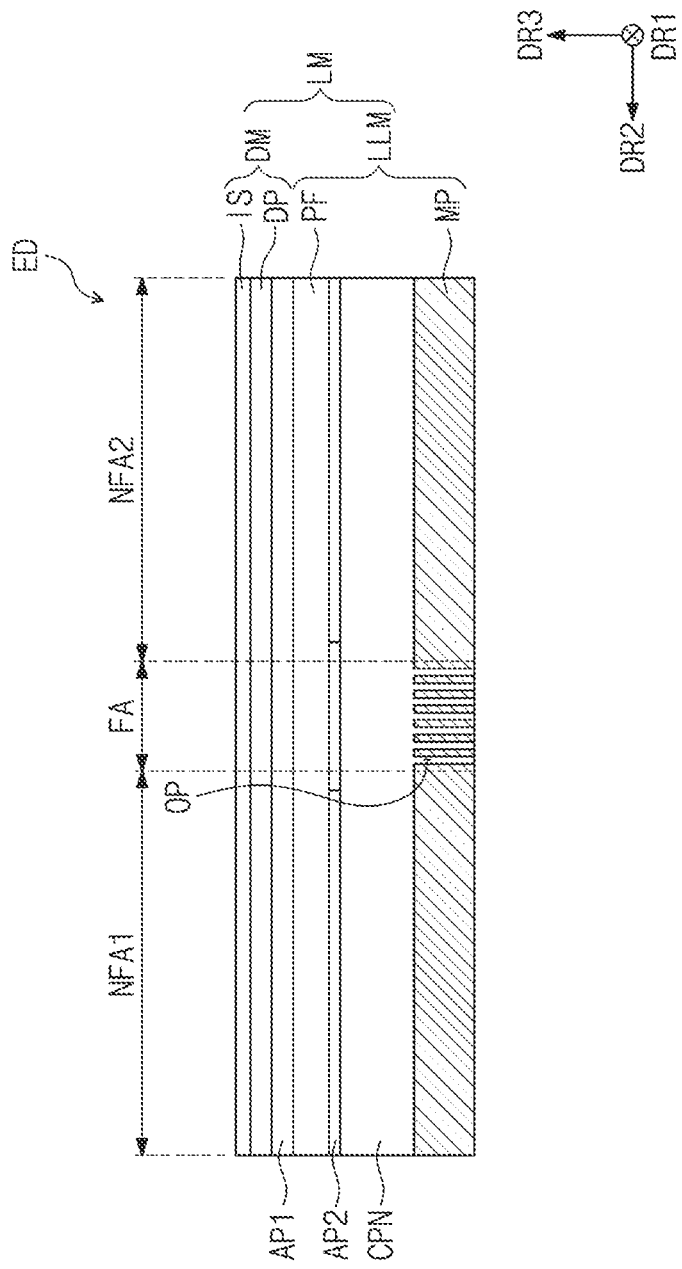
FIG. 8 illustrates preparing a lower module in a method for manufacturing a display device using a protective film module according to an embodiment of the invention.

FIG. 8 illustrates preparing a lower module LM in a method for manufacturing a display device using a protective film module PM according to an embodiment of the invention.

Referring to FIG. 8, the lower module LM including a display module DM and a support module LLM may be prepared. The description of the lower module LM is the same as what has been previously described, and the same reference numerals or symbols are used.

Figure 9A:
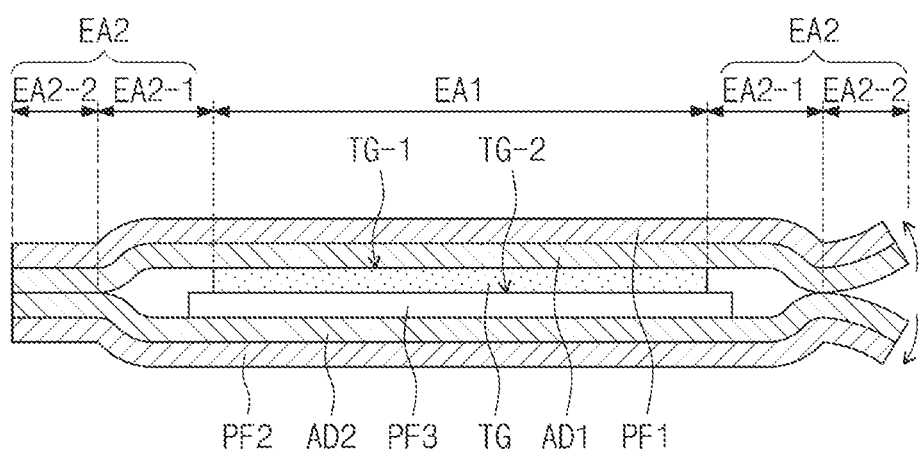
FIGS. 9A and 9B illustrate removing at least one component from a protective film module according to an embodiment of the invention in a method for manufacturing a display device using the protective film module.
Figure 9B:
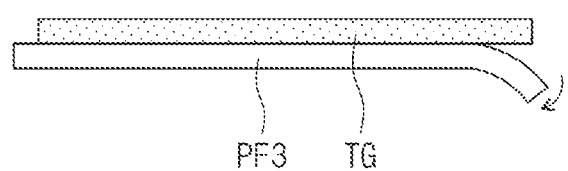

FIGS. 9A and 9B illustrates removing at least one component from the protective film module PM according to an embodiment of the invention in the method for manufacturing the display device ED using the protective film module PM.

Here, since the protective film module PM is the same as the protective film module PM previously described with reference to FIGS. 2 and 3, descriptions thereof are omitted, and the same reference numerals or symbols are used for the same components.

Referring to FIGS. 9A and 9B, a thin-film glass TG which is protected by the protective film module PM may be prepared. Here, a first film PF1 and a first adhesive layer AD1 are coupled onto a first surface TG-1 of the thin-film glass TG, and then a second film PF2, a second adhesive layer AD2, and a third film PF3 may be coupled onto a second surface TG-2 of the thin-film glass TG. All of the first film PF1, the second film PF2, the third film PF3, the first adhesive layer AD1, and the second adhesive layer AD2 may be removed from the protective film module PM which protects the thin-film glass TG. The first adhesive layer AD1 and the second adhesive layer AD2 may be separable from each other since the adhesive force between the first adhesive layer AD1 and the second adhesive layer AD2 is limited to be mutually detached by an external force.

The bond with the thin-film glass TG may be removed by separating the first adhesive layer AD1 and the second adhesive layer AD2 in the outside region EA2-2 of the protective film module PM. The third film PF3 may also be removed at this time (see FIG. 9B) as the third film PF3 is not adhered to the thin-film glass TG by an additional adhesive layer.

Figure 10:
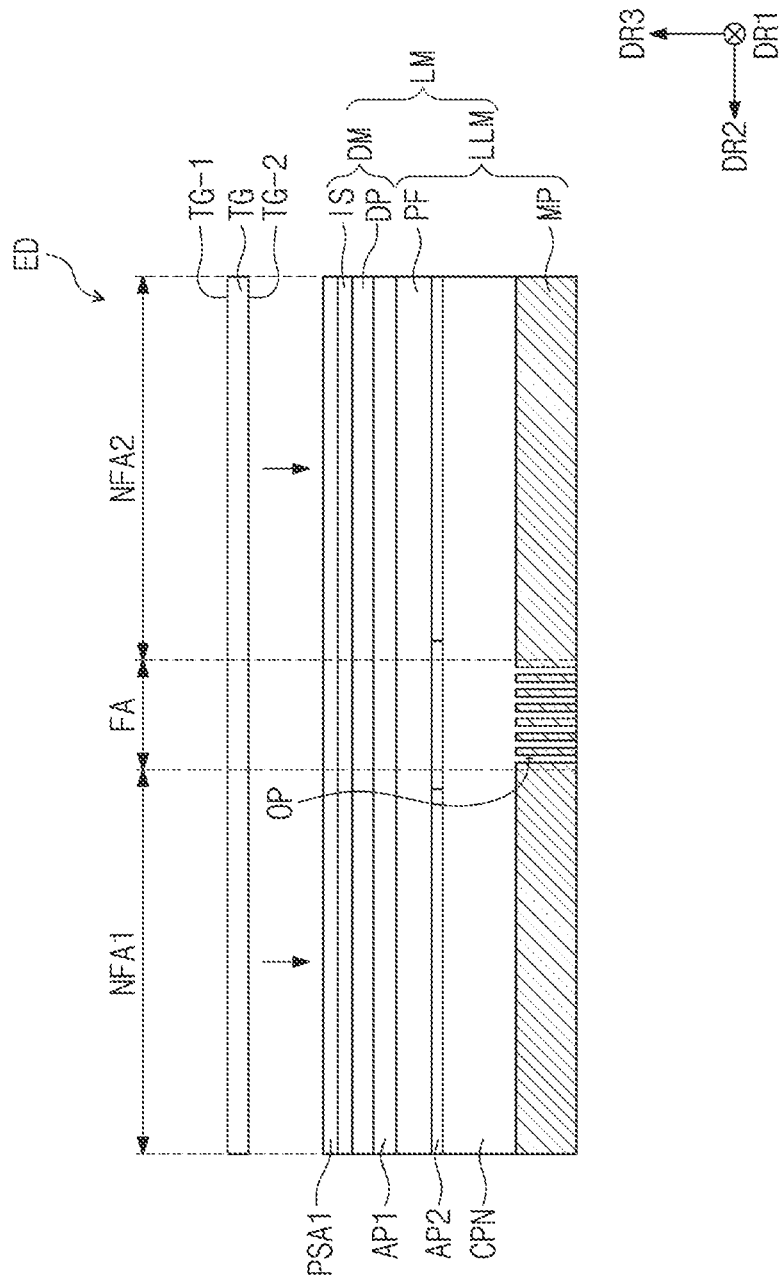
FIG. 10 illustrates coupling a thin-film glass onto a lower module in a method for manufacturing a display device using a protective film module according to an embodiment of the invention.

FIG. 10 illustrates coupling the thin-film glass TG onto the lower module LM in the method for manufacturing the display device ED using the protective film module PM according to an embodiment of the invention.

Referring to FIG. 10, the thin-film glass TG may be coupled onto the lower module LM. As the intermediate adhesive layer PSA1 may exist on the uppermost surface of the lower module LM, the thin-film glass TG may be adhered to a region corresponding to the uppermost surface of the lower module LM. The second surface TG-2, which is the rear surface of the thin-film glass TG, is protected by the third film PF3 (see FIG. 9A), and may thus have less contamination which is caused by the transfer of an adhesive, and the thin-film glass TG is sealed with the first film PF1 and the second film PF2, and may thus have less contamination which is caused by introduction of foreign substances (see FIG. 3). Therefore, it may be unnecessary to perform a plasma process for removing contamination from the adhesion surface of the thin-film glass TG and securing the adhesive force.

Figure 11:
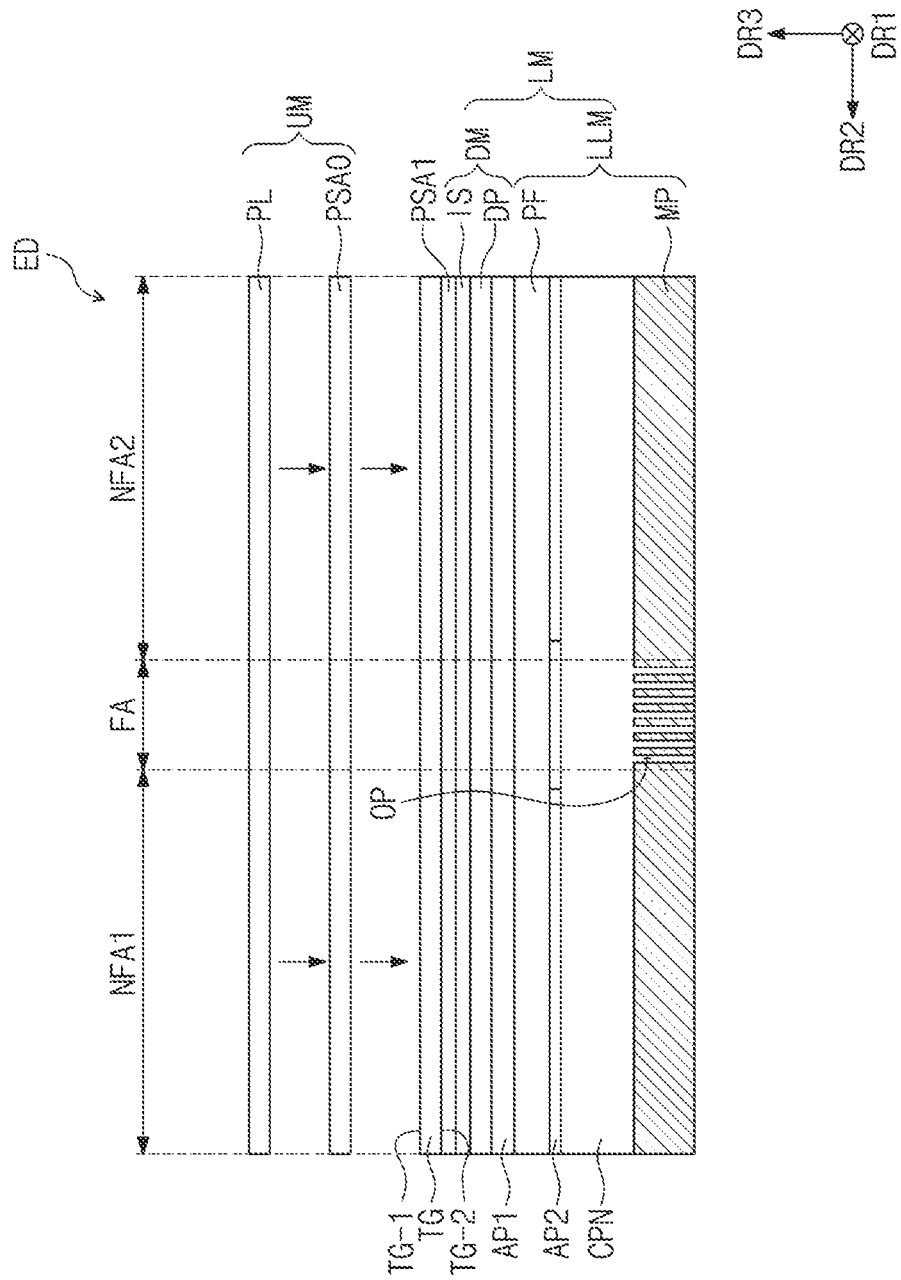
FIG. 11 illustrates coupling an upper module onto a thin-film glass in a method for manufacturing a display device using a protective film module according to an embodiment of the invention.

FIG. 11 illustrates coupling an upper module UM onto the thin-film glass TG in the method for manufacturing the display device ED using the protective film module PM according to an embodiment of the invention.

Referring to FIG. 11, the upper adhesive layer PSA0 and the thin-film glass protective layer PL, which form the upper module UM, may be coupled onto the first surface TG-1 of the thin-film glass TG. Since the thin-film glass TG is sealed with the first film PF1, the second film PF2, the first adhesive layer AD1, and the second adhesive layer AD2, and thus protected from the contamination which is caused by foreign substances, it may be unnecessary to perform a plasma process for removing contamination from the adhesion surface and securing the adhesive force.

Figure 12A:
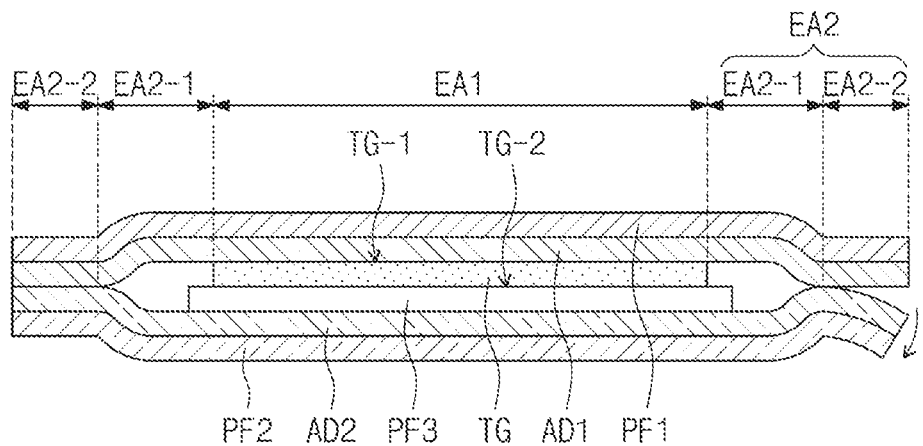
FIGS. 12A and 12B illustrate removing at least one component from a protective film module according to an embodiment of the invention in a method for manufacturing a display device using the protective film module.
Figure 12B:
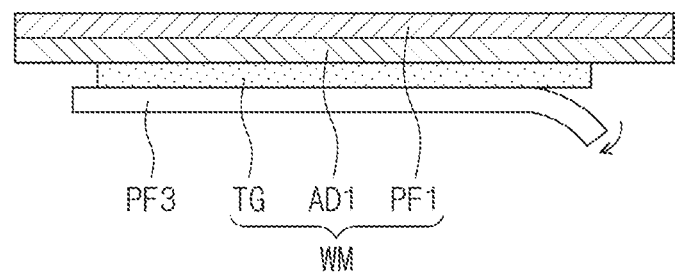

FIGS. 12A and 12B illustrate removing at least one component of the protective film module PM according to an embodiment of the invention in the method for manufacturing the display device ED using the protective film module PM.

Here, since the protective film module PM described herein is the same as the protective film module PM previously described with reference to FIG. 4, descriptions thereof are omitted, and the same reference numerals or symbols are used for the same components.

Referring to FIGS. 12A and 12B, unlike FIGS. 9A and 9B, the first film PF1 and the first adhesive layer AD1 may not be removed, and only the second film PF2, the third film PF3, and the second adhesive layer AD2 may be removed. The first film PF1 may remain as the uppermost surface exposed to the outside of the display device ED which is a finished product, and serve as the thin-film glass protective layer PL (see FIG. 7) previously described. The first adhesive layer AD1 may remain in the display device ED which is a finished product, and serve as the upper adhesive layer PSA0 (see FIG. 7) previously described. The first film PF1, the first adhesive layer AD1, and the thin-film glass TG together may form a window WM.

FIG. 13 illustrates coupling the thin-film glass TG and the remaining components of the protective film module PM onto the lower module LM in the method for manufacturing the display device ED using the protective film module PM according to an embodiment of the invention.

Referring to FIG. 13, the first film PF1 and the first adhesive layer AD1, which are not removed from the protective film module PM, and the thin-film glass TG may be coupled onto the lower module LM at the same time. Since the first film PF1 and the first adhesive layer AD1 serve as the thin-film glass protective layer PL and the upper adhesive layer PSA0, respectively, it may be unnecessary to prepare an additional upper module UM or to couple the upper module UM to the first surface TG-1 of the thin-film glass TG, as illustrated in FIG. 11.

Figure 14:
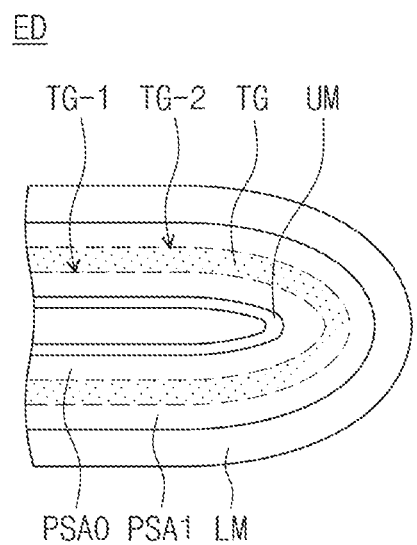
FIG. 14 is a cross-sectional view illustrating a folded display device using a protective film module according to an embodiment of the invention.

FIG. 14 is a cross-sectional view of a folded display device ED using a protective film module PM according to an embodiment of the invention.

Referring to FIG. 14, when the display device ED is folded, the minimum adhesive force for preventing buckling of a thin-film glass TG may be greater in a first surface TG-1 which is the front surface of the thin-film glass TG than in a second surface TG-2 which is the rear surface of the thin-film glass TG. This may require an additional plasma process for removing contamination which is caused by the transfer of an adhesive from the rear surface of the thin-film glass TG and securing the adhesive force. However, according to an embodiment of the invention, since the second surface TG-2, which is the rear surface of the thin-film glass TG, is spaced apart from a second adhesive layer AD2 by a third film PF3, and thus has less contamination which is caused by the transfer of an adhesive, an additional plasma process may be unnecessary.

Figure 15:
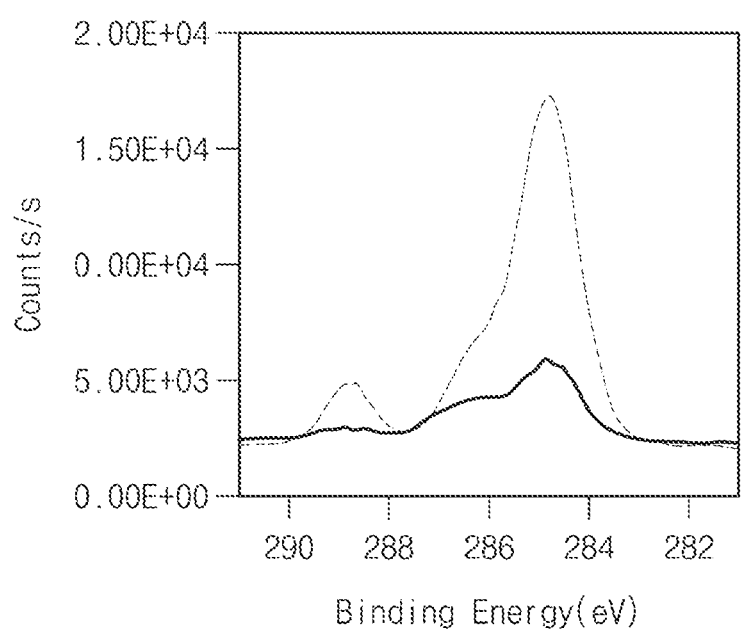
FIG. 15 is a graph showing a surface analysis result of a thin-film glass of a display device using a protective film module according to an embodiment of the invention.

FIG. 15 is a graph showing a surface analysis result of a thin-film glass TG of a display device ED using a protective film module PM according to an embodiment of the invention.

Referring to FIG. 15, the horizontal axis represents binding energy, and the vertical axis represents the number of electrons per second, the electrons being released from the atom having the corresponding binding energy. It may be seen that the larger the value on the vertical axis, the greater the number of electrons corresponding to the energy.

The solid line in the graph represents the surface analysis result of the thin-film glass TG when using the protective film module PM according to an embodiment of the invention. The dotted line in the graph represents the surface analysis result of the thin-film glass TG when not using the protective film module PM according to an embodiment of the invention.

The binding energy ranging from about 284 eV to about 286 eV shows a single bond between carbons, and the binding energy ranging from about 288 eV to about 290 eV shows a double bond between carbon and oxygen. Referring to the graph in FIG. 15, it may be seen that there is more transfer of a carbon-based adhesive to the surface of the thin-film glass TG when not using the protective film module PM according to an embodiment of the invention than when using the protective film module PM according to an embodiment of the invention.

Hereinafter, Table 1 shows the anti-contamination effect of the protective film module PM, according to an embodiment of the invention, on the thin-film glass TG.

Example 1 shows the degree of surface contamination and the surface contact angle of the thin-film glass TG when not using the protective film module PM according to an embodiment of the invention. Example 2 shows the degree of surface contamination and the surface contact angle of the thin-film glass TG when using the protective film module PM according to an embodiment of the invention.

TABLE 1

| | Degree of surface contamination of thin-film glass (Atomic %) Carbon content | Surface contact angle of thin-film glass (°) |
|---|---|---|
| Example 1 | 26.09 | 57 |
| Example 2 | 7.06 | 8 |

Here, the degree of surface contamination of the thin-film glass TG is a value representing, in atomic percentage, the content of carbon in a surface material of the thin-film glass TG, and the surface contact angle of the thin-film glass TG is a value representing the average of surface contact angles of the thin-film glass TG.

Referring to the result of Table 1, it may be seen that the carbon content in Example 2 is lowered to 7.06%, whereas the carbon content in Example 1 is 26.09%. This indicates the carbon content of an adhesive transferred to the thin-film glass TG is reduced.

In addition, it may be seen that the surface contact angle of the thin-film glass TG is 57 degrees (°) in Example 1, whereas the surface contact angle of thin-film glass TG is lowered to 8° in Example 2. This indicates that surface contamination caused by foreign substances entering the thin-film glass TG is reduced.

In general, a plasma process for cleaning the surface of the thin-film glass TG to remove contamination is performed when the surface contact angle of the thin-film glass TG is greater than about 35°.

When the thin-film glass TG is protected with the protective film module PM according to an embodiment of the invention, the surface contact angle of the thin-film glass TG is 8°, less than about 35°, the plasma process may be omitted. As a result, the process of manufacturing the display device ED may be simplified, and unnecessary costs may be saved.

According to the description above, the third film is disposed between the thin-film glass and the second film, thus making it possible to prevent the transfer of an adhesive to the thin-film glass.

Moreover, the first adhesive layer and the second adhesive layer are adhered to each other in the second region that surrounds the first region corresponding to the thin-film glass, thereby preventing foreign substances from entering the side surface of the thin-film glass.

Although the embodiments of the invention have been described, it is understood that the invention should not be limited to these embodiments but various changes and modifications can be made by one ordinary skilled in the art within the spirit and scope of the invention as hereinafter claimed. Therefore, the technical scope of the invention should not be limited to the contents described in the detailed description of the specification, but should be defined by the claims.

What is claimed is:

1. A protective film module having a first region corresponding to a thin-film glass and a second region surrounding the first region, the protective film module comprising:
   a first film configured to protect a first surface of the thin-film glass;
   a first adhesive layer disposed between the thin-film glass and the first film, and in contact with the first surface of the thin-film glass in the first region;
   a second film configured to protect a second surface of the thin-film glass, wherein the second surface is the opposite to the first surface;
   a third film disposed between the thin-film glass and the second film in the first region; and
   a second adhesive layer disposed between the second film and the third film, and in contact with the third film in the first region,
   wherein the first adhesive layer and the second adhesive layer are adhered to each other in the second region.

2. The protective film module of claim 1, wherein the third film is in contact with the second surface of the thin-film glass in the first region.

3. The protective film module of claim 1, wherein a side surface of the third film protrudes outward more than a side surface of the thin-glass in a plan view.

4. The protective film module of claim 1, wherein a planar area of each of the first film and the second film is greater than a planar area of the third film.

5. The protective film module of claim 1, wherein corresponding side surfaces of the first film, the first adhesive layer, the second film, and the second adhesive layer are aligned with each other.

6. The protective film module of claim 1, wherein the third film has a thickness of about 40 micrometers ($\mu$m) to about 60 $\mu$m.

7. The protective film module of claim 1, wherein the second region comprises an inside region, and an outside region which surrounds the inside region and in which the first adhesive layer and the second adhesive layer are adhered to each other.

8. The protective film module of claim 7, wherein a space is defined between the first adhesive layer and the second adhesive layer in the inside region.

9. The protective film module of claim 1, wherein the first film comprises a material different from the second film, and comprises an optically transparent material.

10. The protective film module of claim 1, wherein the first adhesive layer and the second adhesive layer are detachably adhered to each other.

11. The protective film module of claim 7, wherein the outside region, in which the first adhesive layer and the second adhesive layer are adhered to each other, has a constant width.

12. The protective film module of claim 7, wherein the first adhesive layer and the second adhesive layer are tightly adhered to each other in the outside region, to seal the thin-film glass.

13. A method for manufacturing a display device, comprising:
   preparing a lower module;
   preparing a thin-film glass which is protected by a protective film module;
   removing at least one component of the protective film module coupled to the thin-film glass; and
   coupling the thin-film glass onto the lower module,
   wherein the protective film module includes:
      a first film configured to protect a first surface of the thin-film glass,
      a first adhesive layer disposed between the thin-film glass and the first film,
      a second film configured to protect a second surface of the thin-film glass, the second surface being opposite to the first surface,
      a third film disposed between the thin-film glass and the second film, and
      a second adhesive layer disposed between the second film and the third film, wherein the protective film module includes a first region corresponding to the thin-film glass in a plan view and a second region surrounding the first region, the first adhesive layer is in contact with the first surface of the thin-film glass in the first region, the third film overlaps the first region in the plan view, the second adhesive layer is in contact with the third film in the first region, and the first adhesive layer and the second adhesive layer are adhered to each other in the second region.

14. The method of claim 13, wherein in the removing of the at least one component of the protective film module, the first film, the first adhesive layer, the second film, the second adhesive layer, and the third film are removed.

15. The method of claim 13, wherein the lower module comprises a display module including a display panel configured to display an image, and a support module, and the support module includes:
a support plate disposed under the display module; and
a protective film disposed between the support plate and the display module.

16. The method of claim 14, further comprising:
preparing an upper module; and
coupling the upper module to the thin-film glass.

17. The method of claim 16, wherein the upper module comprises:
a thin-film glass protective layer disposed on the thin-film glass; and
an upper adhesive layer disposed between the thin-film glass and the thin-film glass protective layer.

18. The method of claim 13, wherein in the removing of the at least one component of the protective film module, the second film, the second adhesive layer, and the third film are removed.

19. The method of claim 13, wherein the first film comprises an optically transparent material.

20. The method of claim 13, wherein in the preparing of the thin-film glass protected by the protective film module, the first film and the first adhesive layer are coupled onto the first surface of the thin-film glass, and then the second film, the second adhesive layer, and the third film are coupled onto the second surface of the thin-film glass.

* * * * *